Oct. 15, 1929.                    C. N. MITCHELL                    1,731,390
                    METHOD OF AND APPARATUS FOR WELDING TUBES
                              Filed Jan. 7, 1927
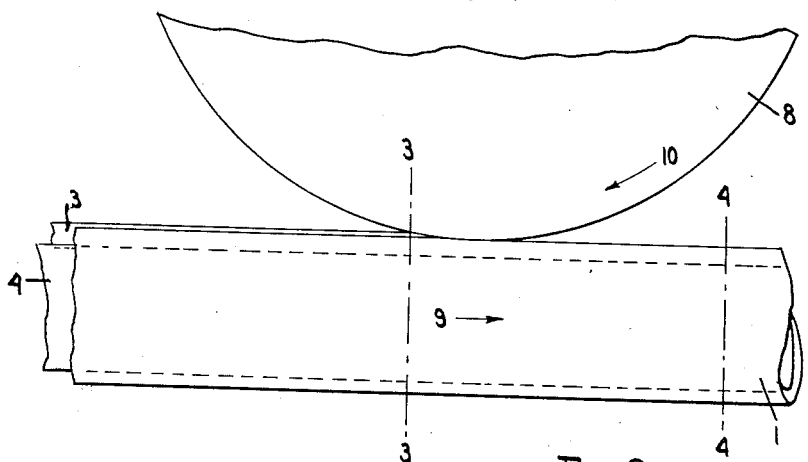
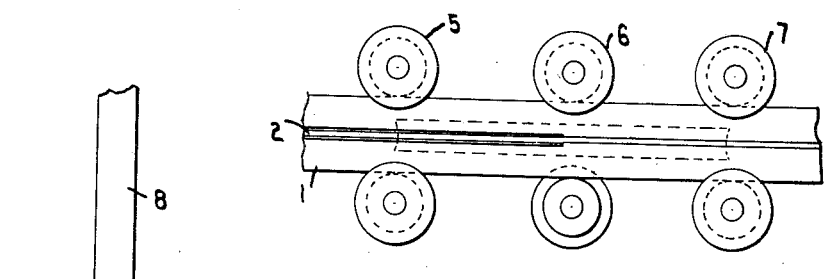
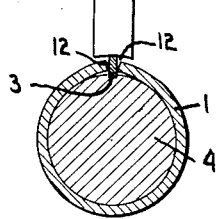
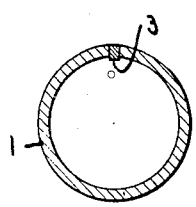
INVENTOR.
Courtney N. Mitchell
BY
Fay, Oberlin + Fay
ATTORNEYS.

Patented Oct. 15, 1929

1,731,390

UNITED STATES PATENT OFFICE

COURTNEY N. MITCHELL, OF CLEVELAND, OHIO

METHOD OF AND APPARATUS FOR WELDING TUBES

Application filed January 7, 1927. Serial No. 159,519.

The present invention, relating, as indicated to a method of and apparatus for welding tubes, is particularly directed to an improved method for integrally joining the edges of formed split tubes. One of the principal objects of the invention is the provision of a method for rapidly and economically welding tubes by mechanical means to produce a uniform weld throughout the length of the tube of a character making it unnecessary to reweld or repair any extensive portions of the tube, as is today the case with certain other types of welded tubes. A further object of the invention is the provision of a method which shall be more rapid in operation than either gas welding or electric welding when carried out at a rate affording a true and continuous weld.

To the accomplishment of the foregoing and related ends, said invention, then, consists of the means hereinafter fully described and particularly pointed out in the claims; the annexed drawings and the following description setting forth in detail certain means and one mode of carrying out the invention, such disclosed means and mode illustrating, however, but one of various ways in which the principle of the invention may be used.

In said annexed drawings:—

Fig. 1 is a side elevation of a tube and welding wheel during the welding operation; Fig. 2 is a plan view of apparatus for carrying out the present method; Fig. 3 is a transverse sectional view on the line 3—3 in Fig. 1; and Fig. 4 is a transverse sectional view of the welded tube.

Referring now to Fig. 1 there is shown a formed, but unwelded tube 1 having an open slot 2 extending longitudinally of the tube, in which I mount a strip 3 of suitable metal, such for example as brass, the strip being supported upon a mandrel 4 disposed within the tube and fixed against movement with the tube as the latter is carried through the welding apparatus. The welding apparatus consists of a series of spaced pairs of rolls 5, 6 and 7 adapted to support and guide the tube both before and after the formation of the weld and to also press the edges of the tube against the intermediate strip of metal 3 and a rotatably mounted metal wheel 8. The tube is passed through the rolls 5, 6 and 7 beneath the wheel 8 in the direction indicated by the arrow 9 while the wheel is rotating in the direction indicated by the arrow 10. The wheel is of large diameter and is rotated to produce a surface speed at the edge of between 15,000 and 20,000 feet per minute. The wheel contacts against the upper surface of the interposed strip 3 and the heat generated by the rapidly moving wheel readily melts the metal of the strip 3, causing it to flow down into the openings between the strip and the upper adjacent edges of the tube 1, as shown in Fig. 3.

The tube is so formed that the adjacent edges extend upwardly away from the true circle formed by the inside of the tube, and thus the intermediate strip 3 is contacted, not by the entire edges of the tube, but by the lower corners, providing triangularly shaped recesses between the strip and the edges into which the metal of the strip may flow as the strip is melted by the action of the wheel. As soon as the projecting edge of the strip is melted off and caused to flow into the recesses referred to the wheel of course contacts the upper surfaces of the abutting edges of the tube and heats these to a welding temperature, causing a true weld or braze between the molten metal of the strip and the heated metal of the tube proper, depending upon whether the strip 3 is of the same metal as the tube or of different metal, such as brass or the like.

The wheel serves a second purpose, which is to plane off and form the upper surface of the welded joint, producing an external surface on the tube at the joint of the form shown in Fig. 4. Thus the exterior of the tube is relatively smooth after the welding operation although further operations may be required in some cases to make this surface perfectly smooth and to bring it to an exact dimension. The inside of the tube carries a projection consisting of that portion of the strip 3 which was originally within the tube, but this can be controlled by the form and size of strip and supporting mandrel.

It will be understood that in order to secure a rapid increase in the temperature of the adjacent edges of the tube and of the interposed strip of material the wheel must be rotated at a high rate of speed and also must be pressed with considerable force against the tube and strip, as the frictional heat developed depends upon both the speed and the pressure. It will also be understood that by using a relatively thin strip between the edges of the tube and by forming this strip of a metal having a considerably lower melting point than that of the tube it is possible to more readily melt the metal of the strip and cause it to flow around and into integral union with the adjacent edges of the strip.

It will be understood that instead of welding the adjacent edges of a formed but open tube the present method and apparatus can, with minor changes, be used to integrally join the adjacent edges of two separate plates, and it will be understood that in this description and in the following claims adjacent edges of a formed tube shall be considered as including therein the adjacent edges of separate unjoined plates, and vice versa.

The advantages of my improved method are its simplicity, speed and uniformity of joint which is secured. If a metal such as brass is employed for the intermediate strip the joint will obviously not be so strong as where the same metal is employed for the strip as for the tube, but for most purposes a sufficiently strong joint can be secured with the use of metal such as brass, and in all cases a fluid-tight and uniform joint can be obtained by this method.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:—

1. In a method of welding spaced parallel adjacent edges of metal plates, the steps which consist in mounting a separate strip of metal between such adjacent edges and in contact therewith, bringing the adjacent edges of said plates and said strip into frictional contact with a rapidly moving element, then moving said plates and strip past said element while pressing the adjacent edges of the plates firmly together and simultaneously supporting the strip, thereby causing metal melted therefrom to flow laterally against and into union with the edges of said plates.

2. In a method of welding the spaced parallel adjacent edges of metal plates, the steps which consist in mounting a strip of metal between and in contact with said adjacent edges, frictionally heating said strip to a welding temperature, and pressing firmly together the edges of said plates against said strip, whereby metal melted from said strip will flow against and into union with the adjacent edges of said plates.

3. In a method of welding spaced parallel adjacent edges of metal plates, the steps which consist in mounting a strip of a metal having a lower melting point than the metal of such plates between and in contact with said adjacent edges, frictionally heating such strip to a welding temperature, and pressing firmly together the edges of said plates against said strip, whereby metal melted from said strip will flow against and into union with the adjacent edges of said plates.

4. In a method of welding spaced parallel adjacent edges of metal plates, the steps which consist in mounting between the adjacent edges of a split tube a strip of a metal of lower melting point than the melting point of the metal of said tube, supporting said strip so that it projects a slight distance above the plane of the adjacent outer edges of said tube, traversing said tube and strip beneath and in contact with a rotating metal element having an edge speed in excess of 15,000 feet per minute, and simultaneously pressing the edges of said tube against said strip to cause the metal melted from said strip to flow into contact and union with the adjacent edges of said tube.

5. In apparatus of the character described, the combination of spaced pairs of aligned guide rolls adapted to receive a tube therebetween, and a rotatably mounted wheel positioned to have its edge engaged against a tube received within said rolls, said wheel being rotated at a speed greatly in excess of the surface speed of the tube and adapted to produce a welding heat at the tube surface.

Signed by me, this 6th day of January, 1927.

COURTNEY M. MITCHELL.